United States Patent
Huang et al.

(10) Patent No.: US 11,803,887 B2
(45) Date of Patent: Oct. 31, 2023

(54) AGENT SELECTION USING REAL ENVIRONMENT INTERACTION

(71) Applicant: Microsoft Technology Licensing, LLC, Redmond, WA (US)

(72) Inventors: Kun Huang, Bellevue, WA (US); Li Wang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 707 days.

(21) Appl. No.: 16/591,252

(22) Filed: Oct. 2, 2019

(65) Prior Publication Data

US 2021/0103967 A1    Apr. 8, 2021

(51) Int. Cl.
| | |
|---|---|
| *G06Q 30/0601* | (2023.01) |
| *G06N 5/043* | (2023.01) |
| *G06K 19/06* | (2006.01) |
| *G06N 3/006* | (2023.01) |

(52) U.S. Cl.
CPC ... *G06Q 30/0617* (2013.01); *G06K 19/06028* (2013.01); *G06K 19/06037* (2013.01); *G06N 3/006* (2013.01); *G06N 5/043* (2013.01)

(58) Field of Classification Search
None
See application file for complete search history.

(56) References Cited

U.S. PATENT DOCUMENTS

| | | | |
|---|---|---|---|
| 9,172,747 B2* | 10/2015 | Walters | G06F 3/167 |
| 10,067,760 B2* | 9/2018 | Ryali | G06F 8/20 |
| 10,275,651 B2 | 4/2019 | Badr et al. | |
| 2007/0033597 A1* | 2/2007 | Mukundan | G06F 16/2358 |
| | | | 719/330 |

(Continued)

FOREIGN PATENT DOCUMENTS

| | | | | |
|---|---|---|---|---|
| CA | 2840252 A1 * | 12/2012 | | G06Q 10/0837 |
| JP | 2003036212 A | 2/2003 | | |
| WO | 2015180496 A1 | 12/2015 | | |

OTHER PUBLICATIONS

"Detect logos", Retreived From: https://cloud.google.com/vision/docs/detecting-logos, Aug. 7, 2019, 8 Pages.

(Continued)

*Primary Examiner* — Alan Chen
(74) *Attorney, Agent, or Firm* — WORKMAN NYDEGGER

(57) ABSTRACT

An agent selection component that selects and activates artificial agents for interacting with a user on behalf of various entity based on user interaction with a real environment. The agent selection component detects user interaction with the real environment, and evaluates the detected user interaction. Based on that evaluation, the agent selection component selects an artificial agent that acts for an entity from amongst multiple artificial agents that act for different entities (e.g., to answer questions, to place orders, to schedule, or the like). The agent selection component then causes the selected artificial agent to activate to interact with the entity. Thus, different interactions with a real environment may result in the agent selection component permitting the user to interface with artificial agents for different entities.

21 Claims, 6 Drawing Sheets

(56) References Cited

U.S. PATENT DOCUMENTS

| | | | |
|---|---|---|---|
| 2009/0063304 A1* | 3/2009 | Meggs | G06Q 30/0625 |
| | | | 705/26.62 |
| 2013/0018726 A1 | 1/2013 | Ionescu et al. | |
| 2013/0191229 A1 | 7/2013 | Rodgers et al. | |
| 2013/0218721 A1* | 8/2013 | Borhan | G06Q 20/306 |
| | | | 705/26.41 |
| 2015/0213355 A1* | 7/2015 | Sharma | H04W 12/082 |
| | | | 706/11 |
| 2015/0347969 A1* | 12/2015 | Davis | G06F 16/958 |
| | | | 705/300 |
| 2015/0350163 A1 | 12/2015 | Brander et al. | |
| 2017/0148073 A1 | 5/2017 | Nomula et al. | |
| 2017/0200152 A1* | 7/2017 | Winkler | G06Q 20/327 |
| 2018/0336045 A1* | 11/2018 | Badr | G06V 20/00 |
| 2019/0080169 A1* | 3/2019 | Nowak-Przygodzki | |
| | | | H04N 5/23245 |
| 2019/0318300 A1* | 10/2019 | Cox | G06Q 10/0633 |

OTHER PUBLICATIONS

"WhatsApp's New Update will let you chat without Opening the App", Retreived From https://www.gqindia.com/content/whatsapp-update-hacks-chat-direct, May 7, 2018, 6 Pages.

Farey, et al., "Detect popular Brands in Images", Retrieved From: https://docs.microsoft.com/en-us/azure/cognitive-services/computer-vision/concept-brand-detection, Apr. 17, 2019, 3 Pages.

Josh, et al., "Snapchat now lets you make QR Snapcodes that open websites", Retreived From: https://techcrunch.com/2017/01/31/website-snapcodES/, Jan. 31, 2017, 6 Pages.

Kaarma, et al., "How to use Messenger Parametric Codes.", Retreived From: https://chatbotslife.com/how-to-use-messenger-parametric-codes-43a08f31b77b, Nov. 21, 2017, 14 Pages.

* cited by examiner

US 11,803,887 B2

AGENT SELECTION USING REAL ENVIRONMENT INTERACTION

BACKGROUND

Intelligence is often defined as the ability to apply information. For instance, information might be used to make decisions. Intelligence can be natural or artificial. "Natural intelligence" is intelligence demonstrated by human beings or animals. For instance, human beings used knowledge to make decisions, exercise skill, and so forth. On the other hand, artificial intelligence (or AI) is all intelligence demonstrated by machines. Artificial intelligence, in its broadest sense which is how the term is used herein, has existed for quite some time. All computing systems demonstrate, to one degree or another, artificial intelligence since they operate using information (e.g., executable-instructions and data). As a very limited example, artificial intelligence may be employed in an effort to mimic natural intelligence (such as human thought or behavior). Early artificial intelligence was exclusively rules based. In more recent times, artificial intelligence can be employed to solve complex problems and even learn.

One current implementation of artificial intelligence is chat bot technology. When a user navigates to a web site belonging to a entity (such as a bank, online store, and so forth), the user may often be given an opportunity to select a chat bot control to help the user resolve questions or acquire information about the entity or its offerings. When that chat bot control is activated, the user may chat with artificial intelligence. Thus, the chat bot acts as an agent for the entity in helping the user resolve questions. The chat bot may be seen as a "artificial agent" that acts for the benefit and on behalf of the entity. The artificial agent is an "artificial" in the sense that it acts on behalf of the entity. The artificial agent is "artificial" in that it is not human, but rather is an artificial intelligence.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

Embodiments disclosed herein relate to an agent selection component that selects and activates artificial agents for interacting with a user on behalf of various entities based on user interaction with a real environment. For instance, if the real environment was a shopping area, a user might take a picture of a logo or storefront of a first store, resulting in activation of an artificial agent for that store. If the user were then to wander to another store front, the user might then take another picture, resulting in activation of the artificial agent for the next store. The user might interact with these artificial agents so that the shopper might have questions answered on behalf of the various stores. Of course, this is just an example, the broader principles apply in any context in which the user may interact with a real environment to interface with artificial agents. Because a single agent selection component causes the various artificial agents to be activated, the user experience is consistent across various entities. For instance, the user process associated with activating an artificial agent may be similar across different entities.

In accordance with the principles described herein, the agent selection component detects user interaction with the real environment, and evaluates the detected user interaction. Based on that evaluation, the agent selection component selects an artificial agent that acts for an entity from amongst multiple artificial agents that act for different entities (e.g., to answer questions, to place orders, to schedule, or the like). The agent selection component then causes the selected artificial agent to activate to interact with the entity. Thus, different interactions with a real environment may result in the agent selection component permitting the user to interface with artificial agents for different entities.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Embodiments disclosed herein relate to an agent selection component that selects and activates artificial agents for interacting with a user on behalf of various entities based on user interaction with a real environment. For instance, if the real environment was a shopping area, a user might take a picture of a logo or storefront of a first store, resulting in activation of an artificial agent for that store. If the user were then to wander to another store front, the user might then take another picture, resulting in activation of the artificial agent for the next store. The user might interact with these artificial agents so that the shopper might have questions answered on behalf of the various stores. Of course, this is just an example, the broader principles apply in any context in which the user may interact with a real environment to interface with artificial agents. Because a single agent selection component causes the various artificial agents to be activated, the user experience is consistent across various entities. For instance, the user process associated with activating an artificial agent may be similar across different entities.

In accordance with the principles described herein, the agent selection component detects user interaction with the real environment, and evaluates the detected user interaction. Based on that evaluation, the agent selection component selects an artificial agent that acts for an entity from amongst multiple artificial agents that act for different entities (e.g., to answer questions, to place orders, to schedule, or the like). The agent selection component then causes the selected artificial agent to activate to interact with the entity. Thus, different interactions with a real environment may result in the agent selection component permitting the user to interface with artificial agents for different entities.

Figure 1:
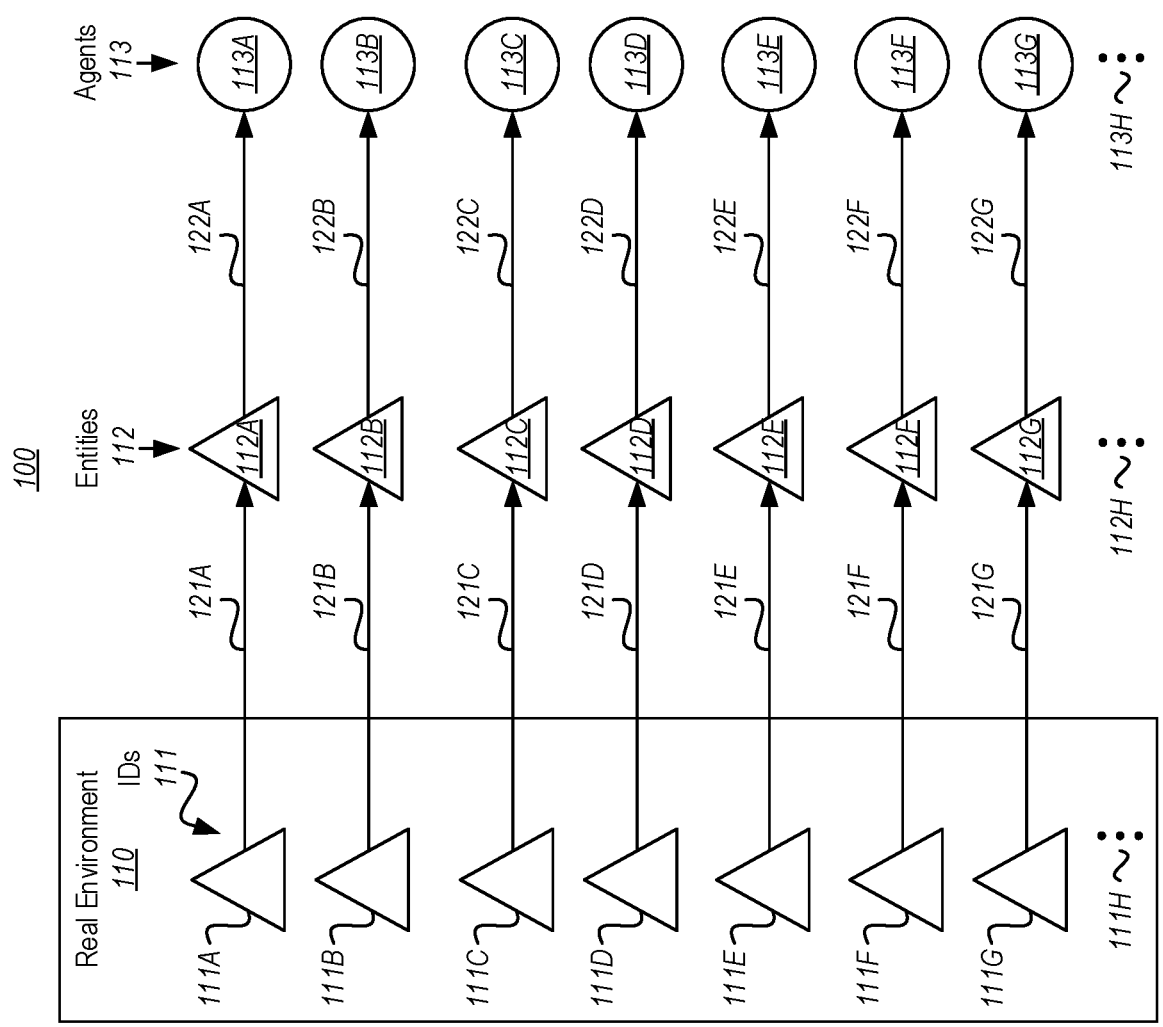
FIG. 1 illustrates an example environment in which the principles described herein may be employed, which includes a real environment that includes identifications of various entities that each have an associated artificial agent.

FIG. 1 illustrates an example environment 100 in which the principles describe herein may be employed. The example environment 100 includes a real environment 110 that includes identifications 111 of various entities 112. Although examples will be provided, the principles described herein are not limited to the nature of the entities 112. As examples only, the entities 112 might each be a person, place, company, organization, artifact, artistic work, store, item for sale, or any other thing about which there might be interest.

Furthermore, although examples will be provided, the identifications 111 of the respective entities 112 may be any manner of identification. As an example only, the identifier might be a logo for a company. Alternatively, the identification might be a code associated with the entity, such as a barcode, QR code, sequence of text, and so forth. The principles described herein may be applied to any real environment in which there are identifications of entities.

In one example referred to herein as the "shopping example", the real environment is a shopping area in which the various entities are companies offering goods or services. For instance, the shopping area might be a grocery store, a shopping mall, a city street, an online shopping clearinghouse, a real estate sales website, industry meeting conventions, airline ticketing areas, and so forth.

In another example referred to herein as the "office example", the real environment might be an office space, in which case the various entities may include employees or other people that occupy various offices. In that case, the identifier might be a name plate located outside each office or cubicle, or perhaps a picture of the person assigned to each office that is posted outside the respective office.

In yet another example referred to as the "social media example", the real environment might be a display of a user who is navigating a social media web site. In that case, the various entities could be persons who have pages or space within the social media web site.

In yet another example referred to herein as a museum example, the real environment is a museum and the various entities could be museum pieces or their artists, contributors, or subjects. For instance, if there was a sculpture of a historic figure, the associated entity might be the historic figure, the sculptor, the sculptures owner, or the contributor of the sculpture.

In another example referred to herein as a library example, the various entities could be books, their characters, and/or their authors, and the real environment could be a library. These are, however, just examples. There are a limitless number of real environments in which an individual may encounter identifications of various entities with which that individual may want to interact. The principles described herein may be applied to any of such real environments.

In the case of FIG. 1, the identifiers 111 are shown as including seven identifiers 111A through 111G (symbolically represented as triangles). The ellipsis 111H represents that the real environment 110 may include any plural number of identifiers 111. As represented by arrows 121A through 121G, the identifiers 111A through 111G identify entities 112A through 121G, respectively. The entities 112 are each symbolically represented with larger triangles. The ellipsis 112H represents that when the real environment 110 includes additional identifiers (as represented by ellipsis 111H), those identifiers may identify yet more entities than those illustrated in FIG. 1.

Furthermore, the ellipsis 111F represents that each entity may have multiple identifiers, and multiple instances of each identifier, within the real environment. For instance, a store might have multiple logos throughout a store or on its storefront, and may also have a logo or text-based identifiers (e.g., a store name posted above the store entrance) at other locations without the same general shopping area, or at different places.

The entities 112 need not be physically present within the real environment 110, but the identifiers 111 are located within the real environment 110. A benefit of the principles described herein is that the user may interact with an artificial representation of the entity without requiring the real-time attention of the entity, without requiring the entity be present, or even without requiring the entity be sentient.

For instance, as presented by lines 122A through 122G, the entities 112 have corresponding artificial (i.e., non-living) agents 113A through 113G (symbolized as circles). The ellipsis 113H represents that when there are additional entities as represented by ellipsis 112H represented by the identifiers 111 within the real environment 110, that those additional entities may also have corresponding artificial agents. The ellipsis 113H also represents that some entities may have more than one possible artificial agent that may be used. These agents 113 are not human, but are rather executable components that are able to interact with the user by, for instance, answering questions, providing information, and the like.

As an example, the artificial agents 113 may interact using rules-based interaction. For instance, given a particular conversation in a particular context, the rules will dictate how the agent interacts with the user. On the other hand, the artificial agents 113 may employ higher-level artificial intelligence, such as neural networks, deep neural networks, or the like. Thus, the artificial agents 113 may even exercise deep learning.

Figure 2:
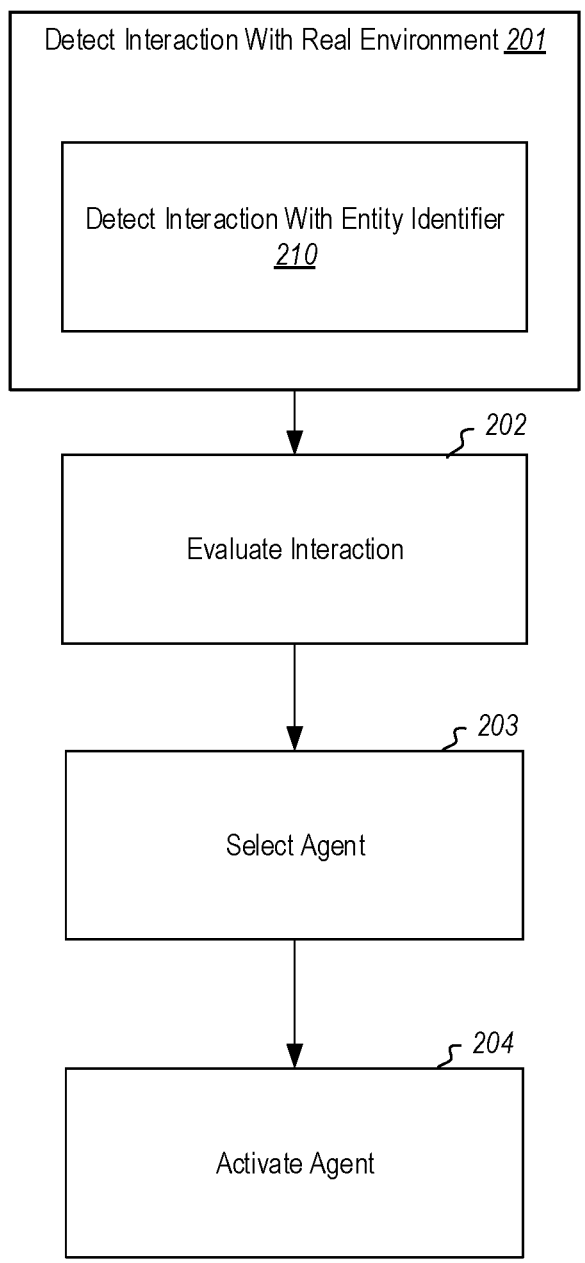
FIG. 2 illustrates a flowchart of a computer-aided method for an agent selection component to select and activate artificial agents for a user to interact with based at least in part upon how that user interacts with a real environment, in accordance with the principles described herein.
Figure 3:
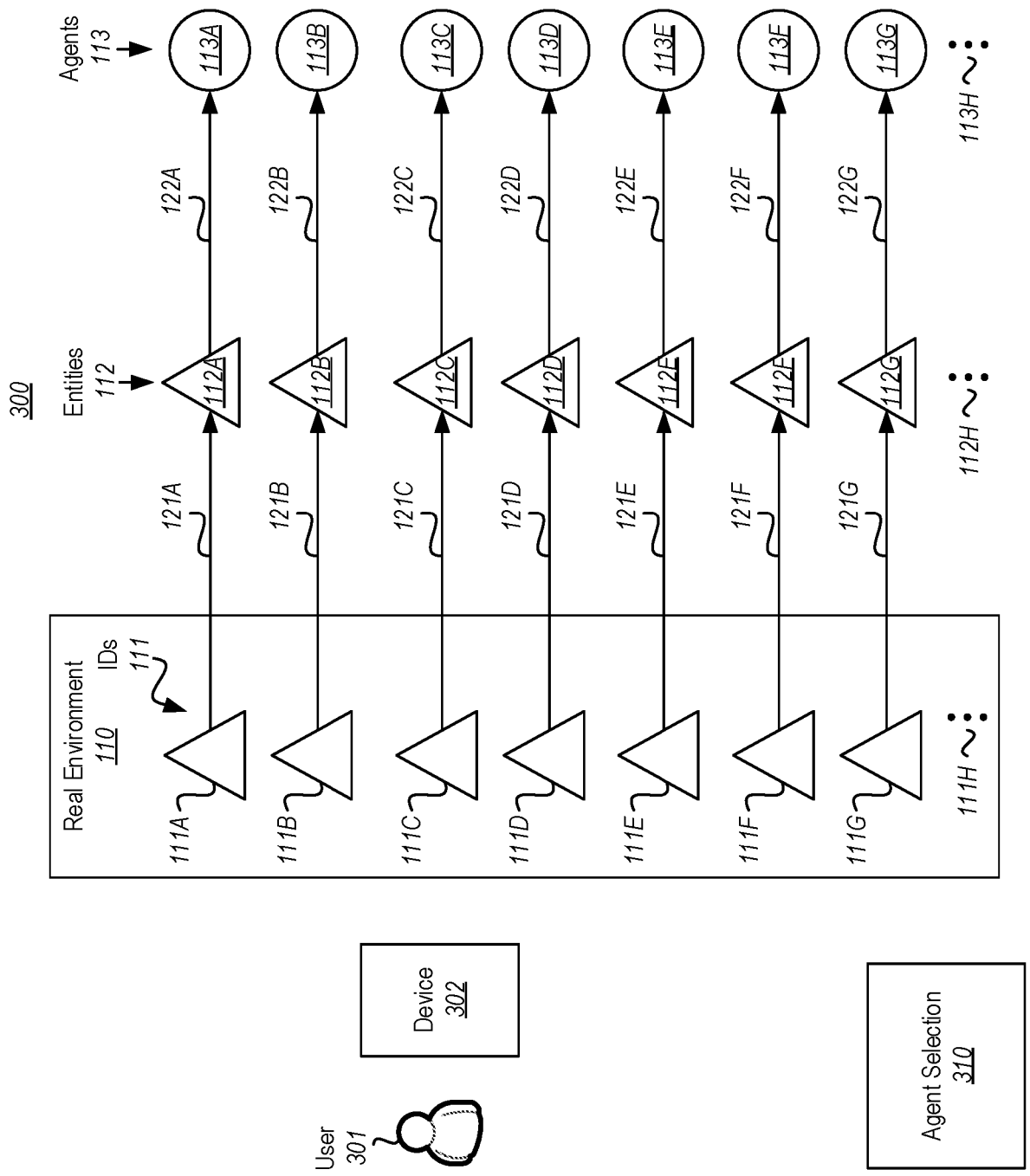
FIG. 3 illustrates an environment that is similar to the environment of FIG. 1, except with the addition of a user, a user device, and an agent selection component that may perform the method of FIG. 2.
Figure 4:
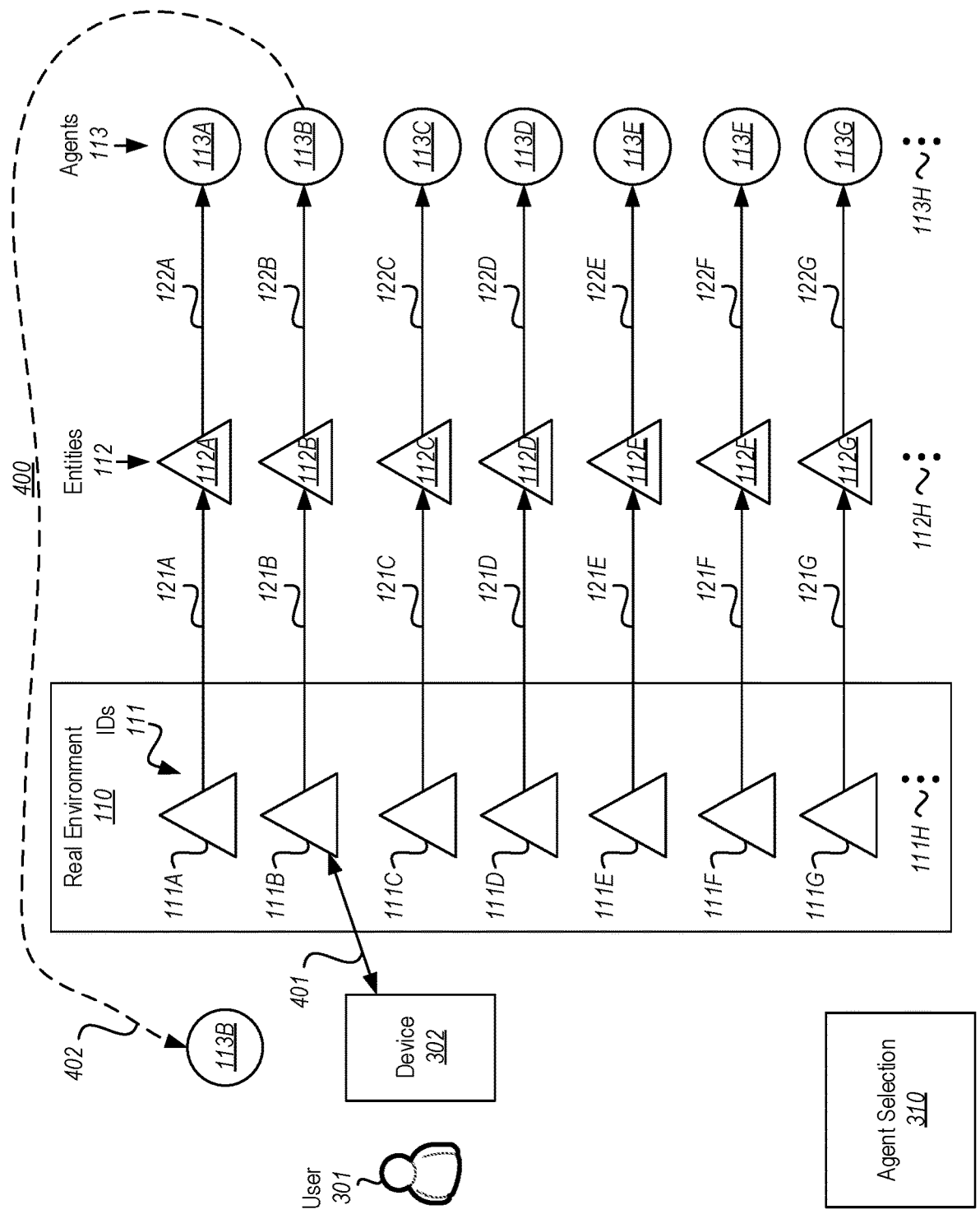
FIG. 4 shows an environment that is similar to the environment of FIG. 3, except that a first interaction between the user (and the user device) and a first identifier within the real environment is shown, along with the resulting corresponding first artificial agent being activated.
Figure 5:
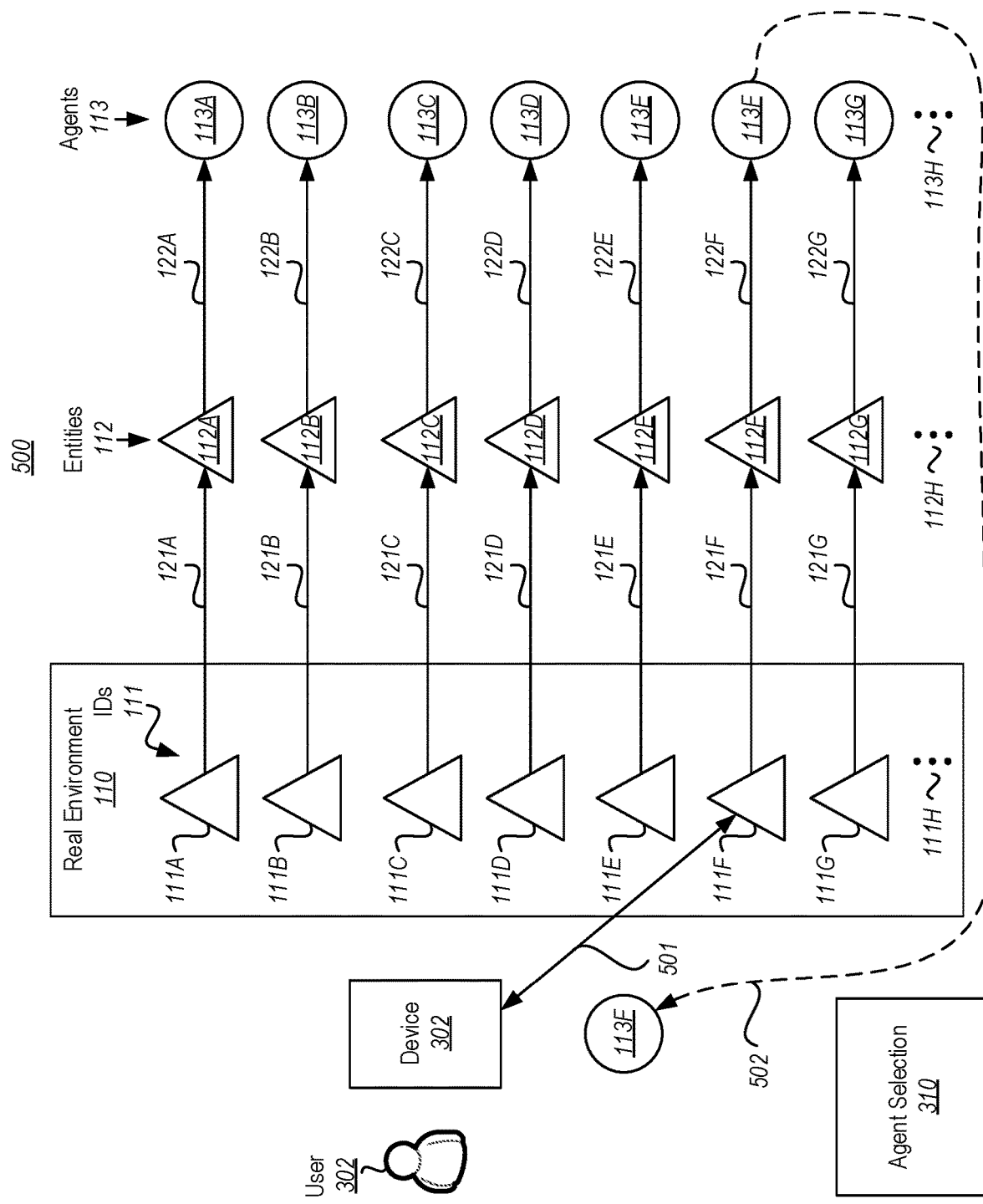
FIG. 5 also shows an environment that is similar to the environment of FIG. 3, except that a second interaction between the user (and the user device) and a second identifier within the real environment is shown, along with the resulting corresponding second artificial agent being activated.

FIG. 2 illustrates a flowchart of a computer-aided method 200 for an agent selection component to select and activate artificial agents for a user to interact with based at least in part upon how that user interacts with a real environment. FIGS. 3 through 5 illustrate the environment 100 of FIG. 1, but with additional elements usable to accomplish the method 200 of FIG. 2. Since the method 200 may be performed within the environment 100 of FIG. 1 as an example, the method 200 of FIG. 2 will now be described with frequent reference to FIGS. 3 through 5. For instance, FIG. 3 illustrates an environment 300 that is similar to the environment 100 of FIG. 1, except with the addition of a user 301, a user device 302 and an agent selection component 310. The method 200 may be performed by the agent selection component 310 of FIG. 3.

The user device 302 may be any device that the user 301 may use to interact with the real environment 110. As an example, the user device 302 may be a device that the user 301 may have access to while physically navigating the real environment 110, such as a handheld device (such as a smartphone), a wearable (such as a smart watch, smart glasses, headphones with or without microphone, or combinations thereof), an implanted device, or combinations or multiples thereof. The portability of such devices may be helpful where physical movement of the user throughout the real environment will help the user access the various identifiers (such as in the shopping example, the office example, the museum example, and the library example).

The user device 302 need not be a portable device, however, if the real environment is something that can be navigated without physical movement of the user (such as in the social media example). For instance, the user 301 might set stationary and navigate an e-commerce site on their user device 302, regardless of whether the user device 302 is portable. As the user navigates through the e-commerce site, the user 301 may encounter any number of virtual agents that may be surfaced by the e-commerce site.

As another example, a dedicated computing system could shared by multiple users when interacting with virtual agents. Multiple shoppers could be positioned at a particular location within a shopping area (such as where a store directory might usually be). Users may then approach the device, and interact with virtual agents of the various stores by interfacing with the display of that dedicated computing system. For instance, the user might select any of the stores from the directory display, and interact with the virtual agent for that corresponding store.

Returning to FIG. 2, the agent selection component detects user interaction with the real environment (act 201). For instance, in FIG. 3, the user 301 may have interacted with the real environment 110 using the user device 302. As a specific example, the user may interact with the real environment (act 201) by interacting with a specific identifier within the real environment (act 210). FIG. 4 shows an environment 400 that is similar to the environment 300 of FIG. 3, except that an interaction 401 is shown, representing an interaction between the user 301 (and the user device 302) and the identifier 111B, and as a result the agent 113B is activated (as represented by arrow 402). More about activation will be described later. However, more details of examples of identifier interaction will now be described.

As an example, the user might have taken a camera capture (e.g., a picture or video) of a company logo, name, storefront, QR code, bar code, or the like. Alternatively, the user might have used smart glasses to gaze at the identifier. The interaction might require specific user action (such as a selection of a control). Alternatively, or in addition, rules or other artificial intelligence may be used to determine when the user has interacted sufficiently with an identifier that activation of an agent would be beneficial or intended. For instance, experience may have taught the agent selection component 310 that when the user gazes towards an identifier for more than three seconds, the user is interested in interacting with the corresponding entity. For a different user, the gaze threshold might be two seconds. For another user, it might be five seconds. For yet another user, gaze alone might be insufficient for the agent selection component to have confidence that the gaze means the user wishes to interact with the corresponding entity (or its artificial agent).

Alternatively, or in addition, the user interaction with the real environment (act 201), may simply be the user positioned himself or herself relative to a location associated with the entity. For instance, the user may be within a certain proximity to a store, which may be sufficient user interaction (or may be used along with other user interaction) with the real environment, for the agent selection component to determine that the agent for that store is to be activated.

Returning to FIG. 2, once the agent selection component detects that the user has interacted with the real environment (act 201), the agent selection component evaluates that detected interaction (act 202). Based on that evaluation, the agent selection component selects an artificial agent (act 203), and causes the selected agent to activate to interact with the user (act 204). For instance, in FIG. 4, the agent selection component 310 detects the user interaction (as represented by arrow 401) with the identifier 111B, evaluates that interaction 401 to select the agent 113B amongst the available agents 113, and activates the agent 113B (as represented by dashed-lined arrow 402). This means that the user 301 may now interact with the agent 113B using the user device 302.

The principles described herein are not limited to the specific mechanism by which the agent selection component 310 causes the selected artificial agent to activate. As an example, the agent selection component may place a function call (with the Internet Protocol (IP) address of the user device 302) to an agent management component (not shown) that responses to the function call by activating the agent. Alternatively, the agent selection component itself may be responsible for activating the agent. Activation of the agent on the device may involve providing an identifier (such as a uniform resource locator or uniform resource identifier) to the user device 302. This, along with perhaps an instruction to navigate to the URI, may then cause the user device 302 (perhaps with the aid of a client application) to activate execute the executable component that operates the artificial agent. The agents 113 may each have been provided by the corresponding entity, or by an agent generation component (not shown) that operates on behalf of an entity to generate an artificial agent for that entity.

The process represented by FIG. 4 and the method 200 of FIG. 2 may be repeated multiple times. For instance, after interacting with the agent 113B, the user 301 may thereafter interact with any of the other identifiers 111 within the real environment to thereby allow the user to interface with agents that act for the identified entities. For instance, FIG. 5 illustrates an environment 500 that is similar to the environment 300 of FIG. 3, except that now the user has interacted (as represented by arrow 501) with the identifier 111F, resulting in the agent selection component 310 causing the agent 113F to be activated (as represented by dashed-lined arrow 502).

More specifically, as represented in FIG. 5, the agent selection component 310 detects that the user 301 has interacted (as represented by arrow 501) with the real environment 110 (act 201) (or more specifically with the identifier 111F) (act 201). The agent selection component 310 evaluates that detected interaction 501 (act 202). Based on that evaluation, the agent selection component 310 selects the agent 113F (act 203), and causes the selected agent 113F to activate to interact with the user (act 204).

This process may be repeated again and again to allow the user, with the aid of an agent selection component, to interact with agents for a variety of entities. Accordingly, multiple interactions with the real environment may result in the agent selection component causing different agents to interact with the user on behalf of different entities.

As an example only, in the shopping example, the user might wander from store to store. The user might interact using a user device with the logo of a first store. For instance, the user might take a picture of that logo. The interaction causes an agent for the first store to activate on the user's device, allowing the user to interact (e.g., visibly, audibly, via text, and/or in any other way) with that agent. That agent might be a chat bot that allows the user to interact with the user via a chat interface. That agent might also be an augmented reality agent. For instance, if wearing smart glasses, an agent (e.g., appearing as a human, a fictional character, an animation of the trademark or product of the entity, an animal, a robot, or the like) might appear superimposed on the real environment (e.g., in front of the store entrance, or in front of the logo).

Similar augmented reality agents might appear using a hand-held device. For instance, the user might have the camera display turned on such that when the camera moves position and orientation, the field of view of the camera likewise changes. The augmented reality agent might move consistent with moves in the field of view, giving the illusion that the user is pointing the camera towards an agent, and that agent is staying stationary with the real environment, even though the user moves the camera.

After the user has interacted with that agent (e.g., asking if there are any sales going on, or special incentives, whether they have a particular product in inventory, and what the price is) the user moves to another store and activate that second stores agent in a similar way by taking a picture of a logo of that second store. Thus, the user can quickly gather information while shopping.

Similarly, when navigating a museum, the user may quickly interface with various agents finding out more about the museum pieces, without requiring the attention of another human. In the office example, the user might interface with artificial agents of workmates in order to schedule time to meet with their workmates later on, or to ask specific questions about the projects they are working on. In the library example, the user might interface with artificial agents of characters or authors of various books in order to quickly discover literary information.

Accordingly, the principles described herein provide a substantial improvement in how users can interact with various entities by interacting with their artificial agents. Some of the systems described above may be implemented by computing systems. Accordingly, a computing system will be described below with respect to FIG. 6.

For instance, the agent selection component 310, and any of the artificial agents 113 may be executable components (such as executable component 606) described below) that execute on a computing system (such as the computing system 600 described below). In that case, the functionality of the component may be performed by the computing system executing computer-executable instructions that are on one or more computer-readable media of the computing system, the computer-executable instructions being structured such that, when executed by the one or more processors of the computing system, the computing system is caused to perform the operations described herein.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 6:
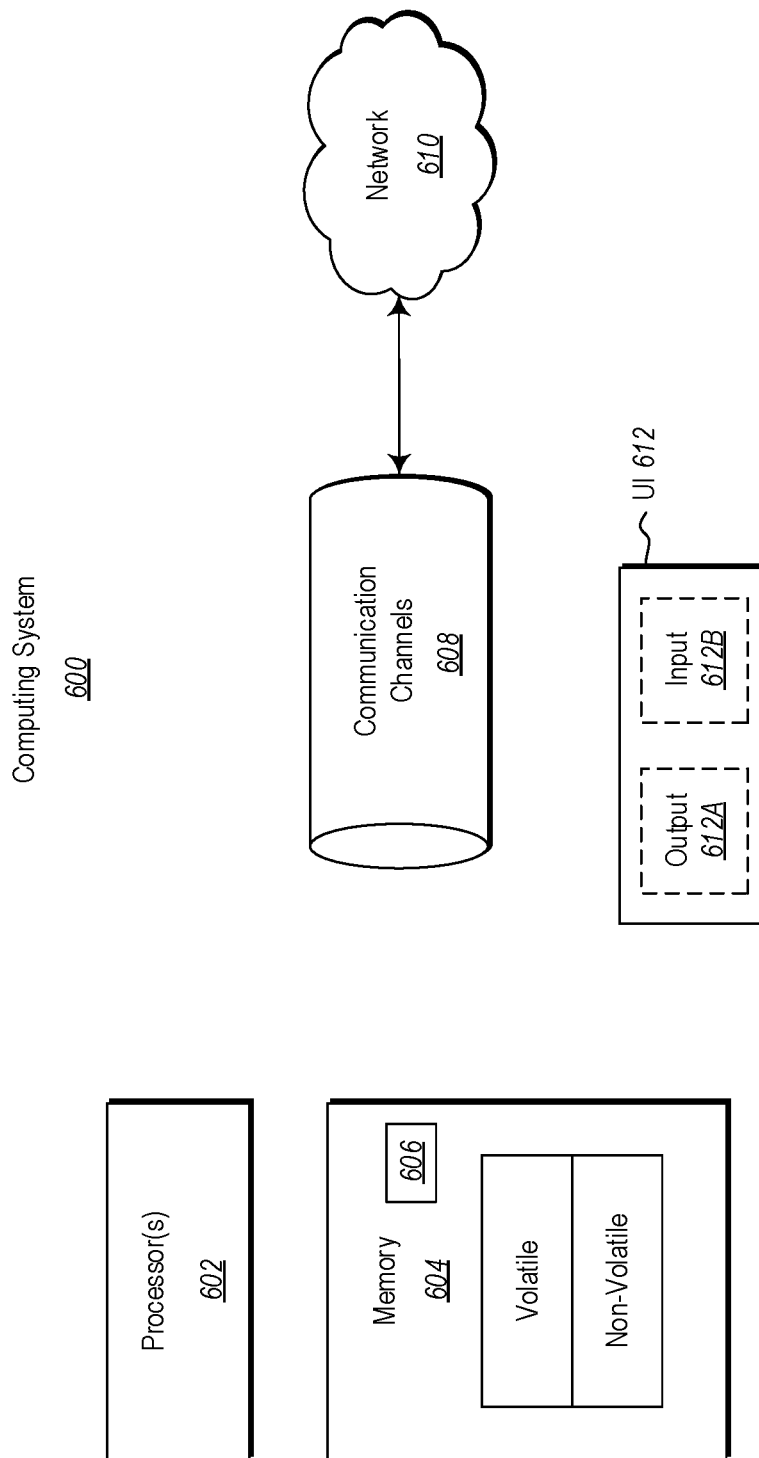
FIG. 6 illustrates an example computing system in which the principles described herein may be employed.

As illustrated in FIG. 6, in its most basic configuration, a computing system 600 typically includes at least one hardware processing unit 602 and memory 604. The processing unit 602 may include a general-purpose processor and may also include a field programmable gate array (FPGA), an application specific integrated circuit (ASIC), or any other specialized circuit. The memory 604 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 600 also has thereon multiple structures often referred to as an "executable component". For instance, the memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 604 of the computing system 600. Computing system 600 may also contain communication channels 608 that allow the computing system 600 to communicate with other computing systems over, for example, network 610.

While not all computing systems require a user interface, in some embodiments, the computing system 600 includes a user interface system 612 for use in interfacing with a user. The user interface system 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, virtual or augmented reality, holograms and so forth. Examples of input mechanisms 612B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system comprising:
   one or more processors; and
   one or more computer-readable media having thereon computer-executable instructions that are structured such that, when executed by the one or more processors, cause the computing system to instantiate and/or operate an agent selection component that is configured to perform the following for multiple different user interactions with a real environment:
   detect a user is positioned relative to a location associated with an entity;
   evaluate the detected relative position of the user;
   based on the evaluation of the relative position of the user, select a single artificial agent that acts for the entity from amongst a plurality of artificial agents that act for different entities; and
   subsequent to a selection of the single artificial agent, cause the selected single artificial agent to activate to interact with the user, wherein the selected single artificial agent is caused to activate, subsequent to the selection of the single artificial agent, by at least (i) forwarding a URL to a user device with an instruction to cause the user device to navigate to the URL or (ii) by placing a function call with an internet protocol (IP) address associated with a user device.

2. The computing system in accordance with claim 1, further comprising:
   detecting and evaluating a user interaction with the real environment, the detected user interaction with the real environment comprising detecting a camera capture, the evaluation resulting in a determination that the camera capture includes an identifier of a second entity.

3. The computing system in accordance with claim 2, the identifier comprising a logo of the second entity.

4. The computing system in accordance with claim 2, the identifier comprising a code associated with the second entity.

5. The computing system in accordance with claim 2, the identifier comprising a text identifier of the second entity.

6. The computing system in accordance with claim 1, the detected relative position of the user being performed using a user device, the selected single artificial agent interacting with the user also using the user device.

7. The computing system in accordance with claim 6, the single selected artificial agent interacting visibly with the user via the user device.

8. The computing system in accordance with claim 7, the selected single artificial agent interacting with the user by using augmented reality superimposed on the real environment that the user interacted with.

9. The computing system in accordance with claim 6, the selected single artificial agent interacting audibly with the user via the user device.

10. The computing system in accordance with claim 1, the entity comprising an organization.

11. The computing system in accordance with claim 10, the organization comprising a store.

12. The computing system in accordance with claim 1, the entity comprising a person.

13. The computing system of claim 1, wherein the selected single artificial agent is activated by at least forwarding the URL to the user device with the instruction to cause the user device to navigate to the URL.

14. The computing system of claim 1, wherein the selected single artificial agent is activated by at least placing the function call with the internet protocol (IP) address associated with the user device.

15. A computer-aided method for an agent selection component to select and activate artificial agents for a user to interact with based at least in part upon how that user interacts with a real environment, the method comprising:
   detecting a first user interaction with the real environment;
   evaluating the detected first user interaction;
   based on the evaluation of the first user interaction, selecting a first artificial agent that acts for a first entity from amongst a plurality of artificial agents; and
   subsequent to selecting the first artificial agent, causing the selected first artificial agent to activate to interact with the user,
   detecting the user is positioned relative to a location associated with a second entity;
   evaluating the detected relative position of the user;
   based on the evaluation of the relative position of the user, selecting a second artificial agent that acts for the second entity from amongst the plurality of artificial agents; and
   subsequent to selecting the second artificial agent, causing the selected second artificial agent to activate to interact with the user, wherein the selected first and second artificial agents are caused to activate, subsequent to the selection of the first and second selected artificial agents, by at least (i) forwarding a URL to a user device with an instruction to cause the user device to navigate to the URL or (ii) by placing a function call with an internet protocol (IP) address associated with a user device.

16. The method in accordance with claim 15, the real environment comprising a shopping area, the first entity being a first store, the second entity being a second store.

17. The method in accordance with claim 16, the first user interaction comprising a first camera capture of a portion of the first store.

18. The method in accordance with claim 17, the evaluation of the first user interaction resulting in a determination that the first camera capture includes an identifier of the first store.

19. The method in accordance with claim 15, the detected first user interaction with the real environment being performed using a user device, the selected artificial agent interacting with the user also using the user device.

20. The method in accordance with claim 19, the user device comprising a handheld, wearable, or implanted device.

21. A computing system comprising:
one or more processors; and
one or more computer-readable media having thereon computer-executable instructions that are structured such that, when executed by the one or more processors, cause the computing system to perform a method for an agent selection component to select and activate artificial agents for a user to interact with based at least in part upon how that user interacts with a real environment, the method comprising:

detecting a user is positioned relative to a location associated with an entity;

evaluating the detected relative position of the user;

based on the evaluation of the relative position of the user, selecting a single artificial agent that acts for the entity from amongst a plurality of artificial agents that act for different entities; and subsequent to a selection of the single artificial agent, causing the selected single artificial agent to activate to interact with the user, wherein the selected single artificial agent is caused to activate, subsequent to the selection of the single artificial agent, by at least (i) forwarding a URL to a user device with an instruction to cause the user device to navigate to the URL or (ii) by placing a function call with an internet protocol (IP) address associated with a user device.

* * * * *